United States Patent [19]

Hong

[11] Patent Number: 5,684,916
[45] Date of Patent: Nov. 4, 1997

[54] APPARATUS AND METHOD FOR AUTOMATIC TRACKING DURING ABNORMAL PLAYBACK OF A VIDEO TAPE

[75] Inventor: Sang-beom Hong, Suwon, Rep. of Korea

[73] Assignee: Samsung Electronics Co., Ltd., Kyungki-do, Rep. of Korea

[21] Appl. No.: 585,921

[22] Filed: Jan. 16, 1996

[30] Foreign Application Priority Data

Jan. 17, 1995 [KR] Rep. of Korea ............... 95-704

[51] Int. Cl.$^6$ ............... H04N 5/783; H04N 5/93
[52] U.S. Cl. ............... 386/68; 386/78; 360/64; 360/77.13
[58] Field of Search ............... 386/6–8, 13–14, 386/21, 68, 72, 78, 81, 113, 114, 85–87; 360/77.01, 77.12, 77.13, 61, 63–64; H04N 5/783, 5/93, 5/92, 9/79

[56] References Cited

U.S. PATENT DOCUMENTS

| | | | |
|---|---|---|---|
| 4,451,860 | 5/1984 | Honjo et al. | 360/77.16 |
| 4,720,753 | 1/1988 | Iwasaki et al. | 360/77.15 |
| 5,214,546 | 5/1993 | Yamada | 360/77.13 |
| 5,218,489 | 6/1993 | Jeong et al. | 360/77.13 |
| 5,546,247 | 8/1996 | Fujioka et al. | 360/77.13 |

*Primary Examiner*—Thai Tran
*Attorney, Agent, or Firm*—Sughrue,Mion,Zinn,Macpeak & Seas, PLLC

[57] ABSTRACT

A video tape playback device in which heads are tracking-controlled according to a predetermined tracking control value, in order to accomplish automatic tracking so that noise is not regenerated on the screen during an abnormal speed playback. The device has a direct-current (DC) envelope detector for detecting a direct-current (DC) envelop signal of a video signal read out a video tape via video heads; a comparator for comparing the detected DC envelop signal with a predetermined threshold value, and outputting a pulse signal representing the comparison result; a servo portion for performing a tracking operation according to a tracking control value, and generating a pulse of a head switching signal; and a controller for detecting a difference of time between a falling edge in the pulse signal output from the comparison means and a point of level alteration time of the head switching pulse, and controlling the predetermined tracking control value so that the detected time difference is within a range where noise is not regenerated on a screen to be displayed.

10 Claims, 4 Drawing Sheets

APPARATUS AND METHOD FOR AUTOMATIC TRACKING DURING ABNORMAL PLAYBACK OF A VIDEO TAPE

BACKGROUND OF THE INVENTION

The present invention relates to an automatic tracking apparatus for a video cassette recorder (VCR) and a method therefor, and more particularly, to an automatic tracking apparatus operative during special playback, which enables a viewer to enjoy a clear picture on a screen without noise, and a method therefor.

In the VCR, a tracking control causes a video head to accurately travel a specified position of tracks to obtain the maximum envelope output. There is known an automatic tracking method which performs such a tracking control automatically when data recorded on a tape is played back at the normal speed. However, such a prior art technology cannot be applied to a case when the recorded data is played back at an abnormal speed.

That is, in the VCR, an envelope waveform of an output signal during an abnormal speed playback such as slow or multiple speed playback, is formed differently from that of normal speed playback. Thus, a tracking position can be set as an amount of sampling of the maximum video signal envelope within one period of time of a head switching signal during the normal speed playback. However, noise can be generated in the playback of the slow or multiple speed (hereinafter called an abnormal speed playback) although the tracking position can be set as an amount of sampling of the maximum video signal envelope. Accordingly, an optimum picture cannot be obtained easily.

Another prior art technology of automatically performing a tracking control even in the abnormal speed playback, is disclosed in British patent publication No. 2,251,717 A. The tracking control circuit disclosed in the above British patent publication samples a predetermined number of pulses for half of the head switching pulse, integrates the sampled data and takes a pulse which is larger than an envelope level. Then, a tracking control is performed when widths of a falling edge of the pulse and that of the sample pulse are larger than a predetermined reference width. However, this prior art also cannot perform the optimum tracking control.

SUMMARY OF THE INVENTION

Therefore, to solve the above problems, it is an object of the present invention to provide an automatic tracking apparatus and method for automatically controlling tracking so that noise is not reproduced in a picture on a screen.

It is another object of the present invention to provide an automatic tracking apparatus and method for controlling a tracking position so that an envelope of an output signal is maximized.

To accomplish the above object of the present invention, there is provided an automatic tracking method for a video tape playback device in which heads are tracking-controlled according to a predetermined tracking control value, the automatic tracking method comprising the steps of:

detecting a direct-current (DC) envelope signal of a video signal read out of a video tape via video heads comparing the detected DC envelope signal with a predetermined threshold value;

detecting a time difference between a point of time when a value of the DC envelope signal becomes below the threshold value and a point of time for switching the video heads; and controlling the predetermined tracking control value so that the detected time difference is within a range where noise is not regenerated on a screen to be displayed.

Another object of the present invention can be accomplished by providing a video tape playback device in which heads are tracking-controlled according to a predetermined tracking control value, the video tape playback device comprising:

a direct-current (DC) envelope detector for detecting a direct-current (DC) envelope signal of a video signal read out a video tape via video heads; a comparator for comparing the detected DC envelope signal with a predetermined threshold value, and outputting a pulse signal representing the comparison result; a servo portion for performing a tracking operation according to a tracking control value, and generating a pulse of a head switching signal; and a controller for detecting a difference of time between a falling edge in the pulse signal output from the comparison means and a point of level alteration time of the head switching pulse, and controlling the predetermined tracking control value so that the detected time difference is within a range where noise is not regenerated on a screen to be displayed.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
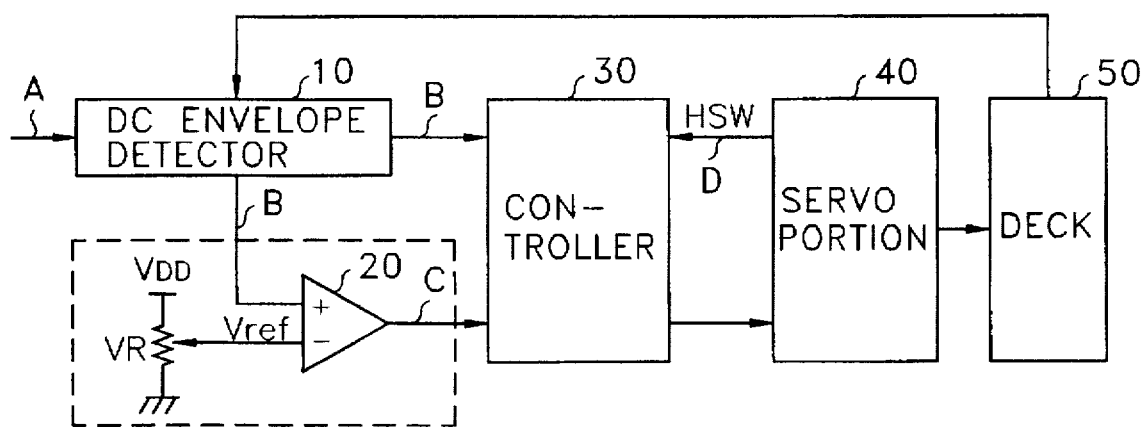
FIG. 1 is an automatic tracking apparatus operative during a special playback operation according to a preferred embodiment of the present invention.

As shown in FIG. 1 representing an automatic tracking apparatus during special playback according to the present invention, the automatic tracking apparatus includes a DC envelope detector 10 for detecting a DC envelope value of a video signal reproduced from a deck 50. The DC envelope value is applied to a controller 30 and a non-inverting input end of comparator 20, respectively. Comparator 20 compares the DC envelope value with a predetermined threshold value and outputs the result to controller 30. Controller 30 receives the DC envelope value, the output value of comparator 20 and a head switching signal output from a servo portion 40, and controls servo portion 40 so that the optimum tracking is accomplished. Servo portion 40 controls deck 50 having a drum motor (not shown) and a capstan motor (not shown) and performs an automatic tracking control.

Figure 2A:
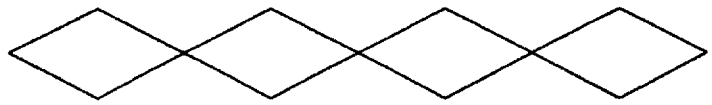
FIGS. 2A through 2D are waveform diagrams of the respective portion of the FIG. 1 apparatus.
Figure 2B:
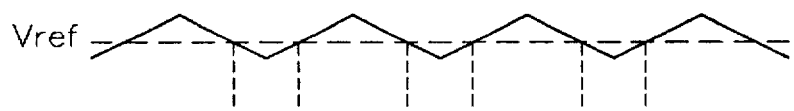
Figure 2C:
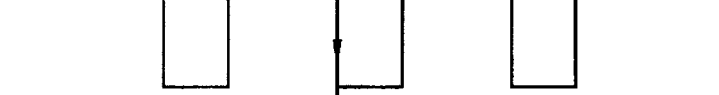
Figure 2D:
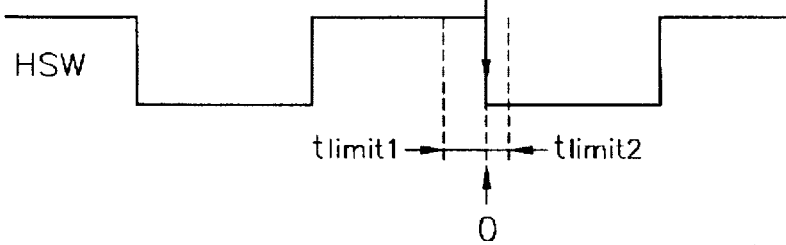

FIGS. 2A through 2D are waveform diagrams of the respective portions of the FIG. 1 apparatus. Referring to FIGS. 1 through 2D, an operation of the automatic tracking apparatus during the abnormal speed playback, will be described in more detail.

Controller 30 controls servo portion 40 to perform a slow or multiple speed playback. Servo portion 40 includes a drum servo for controlling rotation of a video head uniformly and a capstan servo for traveling a video tape and uniformly maintaining a speed of the tape. The drum servo controls speed and phase of the drum motor. A speed control enables the drum motor to maintain the speed of 1800 rpm and a phase control determines a mechanical position with respect to a vertical sync (V-SYNC) signal.

The capstan motor and the drum motor included in deck 50 operate according to a control signal of servo portion 40. Accordingly, the video signal recorded on the tape is read out via the video head. The read-out video signal is shown as the waveform of FIG. 2A. If the video signal of FIG. 2A is input to DC envelope detector 10, DC envelope detector 10 detects the DC envelope of the video signal and amplifies the detected DC envelope signal into a magnitude which can be recognized by controller 30. The DC envelope signal is shown as the FIG. 2B waveform. The DC envelope signal of FIG. 2B is input to controller 30 and comparator 20. Comparator 20 is composed of an operational amplifier. The non-inverting input end of comparator 20 receives the DC envelope signal of FIG. 2B, and the inverting input end thereof receives a threshold value Vref. Here, threshold value Vref is a reference value with respect to noise judgement. Comparator 20 compares threshold value Vref shown as the dotted line in FIG. 2B with the DC envelope signal shown as the solid line therein, and generates a rectangular wave shown as FIG. 2C to output the same to controller 30. Further, controller 30 receives head switching signal HSW from servo portion 40. Head switching signal HSW is shown as the FIG. 2D waveform. Controller 30 samples the DC envelope signal for one head switching pulse generation period with a predetermined number of times and accumulates the sampled DC envelope value. Moreover, controller 30 obtains a difference of time (shown as t1 in FIG. 2D) between the falling edges of the FIG. 2C rectangular wave and the FIG. 2D head switching signal HSW. Here, time difference t1 depends on the tracking and represents the current state of the tracking. Controller 30 uses time difference t1 and the accumulated value SUM-VE of the sampled envelope value and calculates the tracking position. Hereinafter, the operation of calculating the tracking position in controller 30 will be described in more detail with reference to FIGS. 3 through 6.

Figure 3:
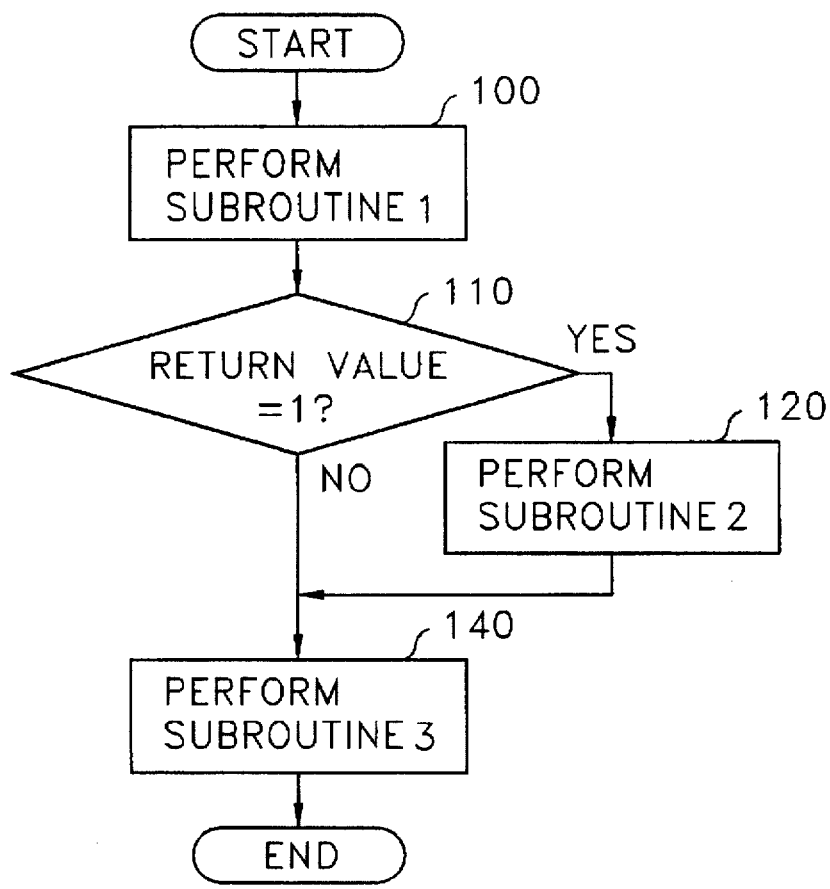
FIG. 3 is a main flowchart diagram of an operation performed by the controller in the FIG. 1 apparatus.

FIG. 3 is a main flowchart diagram for explaining an automatic tracking control method during an abnormal speed playback in controller 30 of FIG. 1. As shown in FIG. 3, controller 30 performs subroutine 1 in step 100 to check whether the calculated time difference t1 exists in a range where the noise is not regenerated on the screen, that is, between $t_{Limit1}$ and $t_{Limit2}$ of FIG. 2D. Here, the range between $t_{Limit1}$ and $t_{Limit2}$ where the noise is not regenerated, means the first sixteen scanning lines and part of the rear scanning lines both of which are not scanned on the screen among two hundred fifty six scanning lines of one field. Thus, if time difference t1 exists between $t_{Limit1}$ and $t_{Limit2}$, a clean picture without noise can be viewed.

Figure 4:
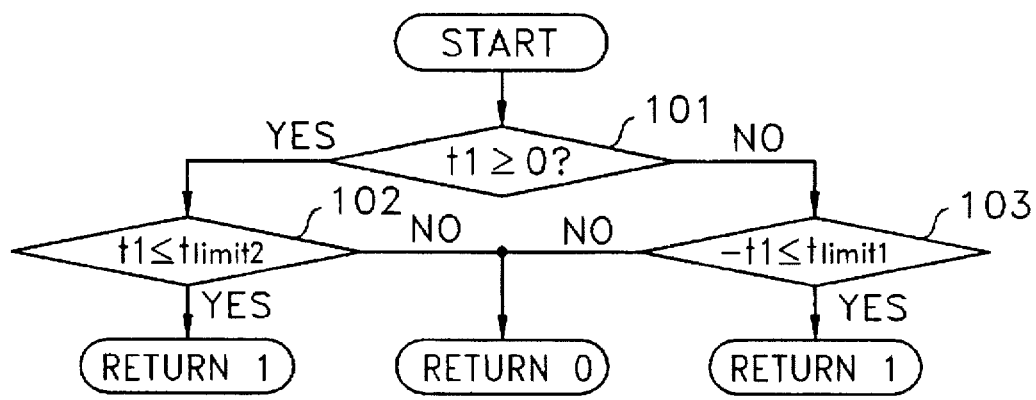
FIG. 4 is a flowchart diagram of a subroutine 1 in the FIG. 3 main flowchart diagram.

The subroutine 1 in step 100 is shown in FIG. 4. As can be seen from FIG. 4, controller 30 judges whether time difference t1 is not less than "0" (that is, t1≧0) in step 101. If time difference t1 is not less than "0," controller 30 judges whether time difference t1 is not more than "$t_{Limit1}$" which is the upper limit in the range between $t_{Limit1}$ and $t_{Limit2}$ where the noise is not regenerated, that is, t1≦$t_{Limit1}$ in step 102. If time difference t1 is less than "0," controller 30 judges whether negative time difference t1 is more than "$t_{Limit2}$" which is the lower limit in the range between $t_{Limit1}$ and $t_{Limit2}$, that is, t1≧$t_{Limit2}$, in step 103. When a judgement condition is satisfied in step 102 or 103, a return value is made "1" or "0" and then the operation proceeds to step 110 of FIG. 3.

Referring again to FIG. 3, controller 30 which has performed subroutine 1 judges whether the return value is "1." That is, controller 30 judges in step 110 whether time difference t1 exists in the range between $t_{Limit1}$ and $t_{Limit2}$ where the noise is not regenerated. When the return value is not "1," that is, when time difference t1 is beyond the above range, controller 30 performs subroutine 2 in step 120, while controller 30 performs subroutine 3 when the return value is "1" in step 140.

Figure 5:
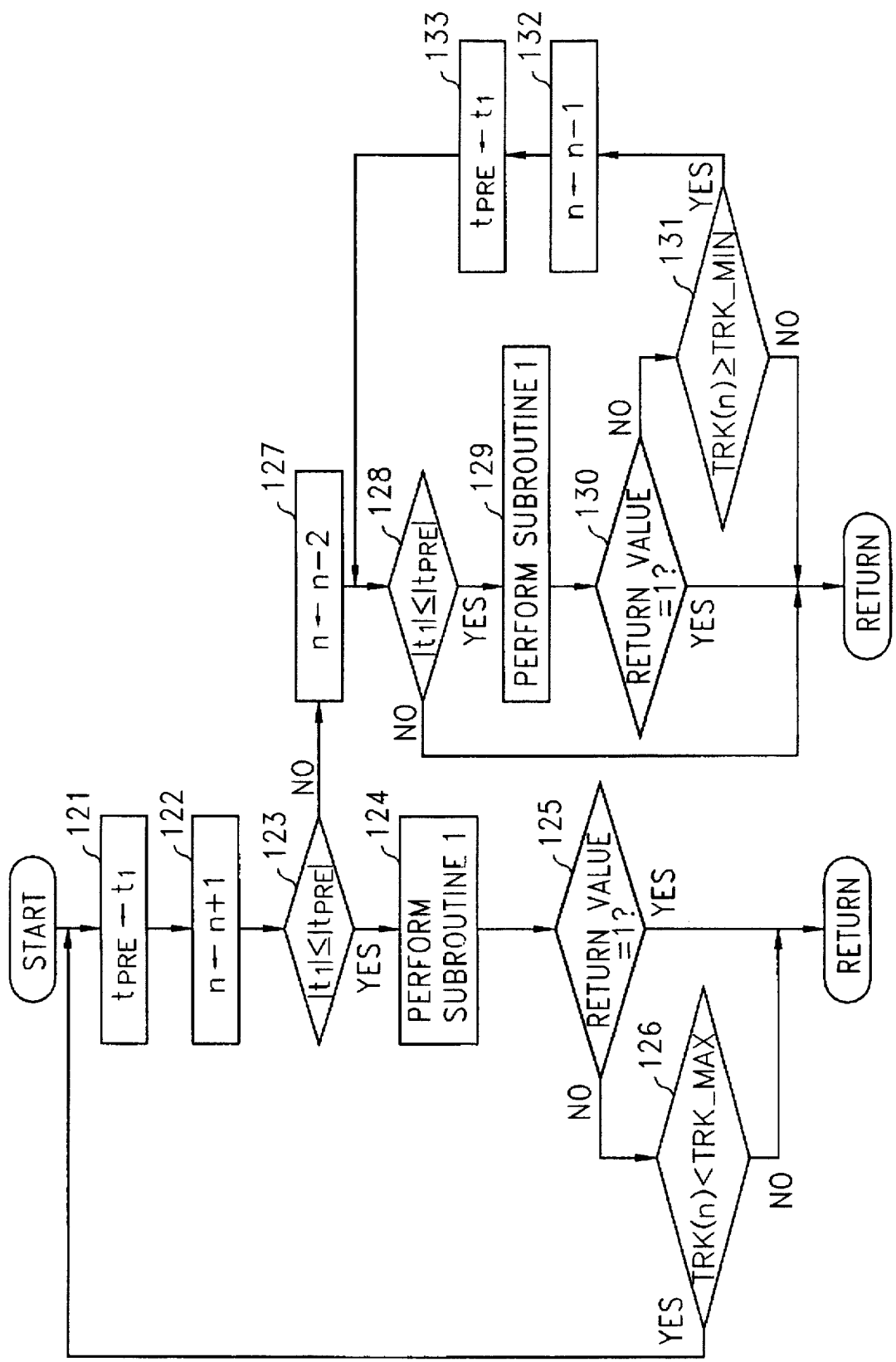
FIG. 5 is a flowchart diagram of a subroutine 2 in the FIG. 3 main flowchart diagram.

FIG. 5 is a flowchart diagram of a subroutine 2 in the FIG. 3 main flowchart diagram. That is, FIG. 5 is a flowchart diagram illustrating the operation of controller 30 which sets the tracking position within the range where the noise is not regenerated on the screen. As shown in FIG. 5, time difference t1 which is the current state of the tracking is stored as a previous time difference $t_{PRE}$ in step 121. Controller 30 increases step n by one step, that is, sets that n equals n+1 in step 122. Here, step n represents a predetermined tracking control value for the abnormal speed playback tracking such as slow or multiple speed playback. Then, controller 30 compares the absolute value of the current time difference |t1| with that of the previous time difference |$t_{PRE}$| in step 123. If the absolute value of the current time difference is smaller than that of the previous time difference, that is, if |t1|≦|$t_{PRE}$|, controller 30 performs subroutine 1 as shown in FIG. 4 in step 124. After subroutine 1 has been performed in step 124, controller 30 judges again whether the return value is "1" in step 125. If the return value is "1," controller 30 judges that the altered tracking position is located in the range where the noise is not regenerated and proceeds to subroutine 3 shown in FIG. 3. If the return value is not "1," controller 30 compares the current tracking position value TRK(n) with variable maximum position value TRK_MAX in step 126. If the current tracking position value is not more than that of the variable maximum position, that is, if TRK(n)≦TRK_MAX, controller 30 returns to step 121 and repetitively performs steps 121 through 126. However, if the current tracking position reaches the variable maximum position, controller 30 judges that there is no proper position and proceeds to subroutine 3 of FIG. 3.

If the absolute value of the current time difference is larger than that of the previous time difference in step 123, that is, if |t1|>|$t_{PRE}$|, controller 30 decreases step n by two steps, that is, sets that n equals n−2 in step 127. Then, controller 30 compares the absolute value of the current time difference t1 with that of the previous time difference $t_{PRE}$ in step 128. If the absolute value of the current time difference is larger than that of the previous time difference, the operation proceeds to subroutine 3 of FIG. 3. However, if the absolute value of the current time difference is smaller than that of the previous time difference, controller 30 performs subroutine 1 as shown in FIG. 4 in step 129. After subroutine 1 has been performed in step 129, controller 30 judges again whether the return value is "1" in step 130. If the return value is "1," controller 30 judges that the altered tracking position is located in the range where the noise is not regenerated and proceeds to step 140 shown in FIG. 3. If the return value is not "1," controller 30 compares the current tracking position value TRK(n) with variable minimum position value TRK_MIN in step 131. If the current tracking position value is not less than the variable minimum position value, that is, if TRK(n)≧TRK_MIN, controller 30 decreases the current step n by one in step 132. Then, controller 30 stores the time difference t1 in the current tracking as time difference $t_{PRE}$ in the previous tracking in step 133, returns to step 128 and repetitively performs steps 128 through 133. However, if the current tracking position value TRK(n) is less than the variable minimum position value TRK_MIN, controller 30 judges that there is no proper position and proceeds to step 140 of FIG. 3.

Figure 6:
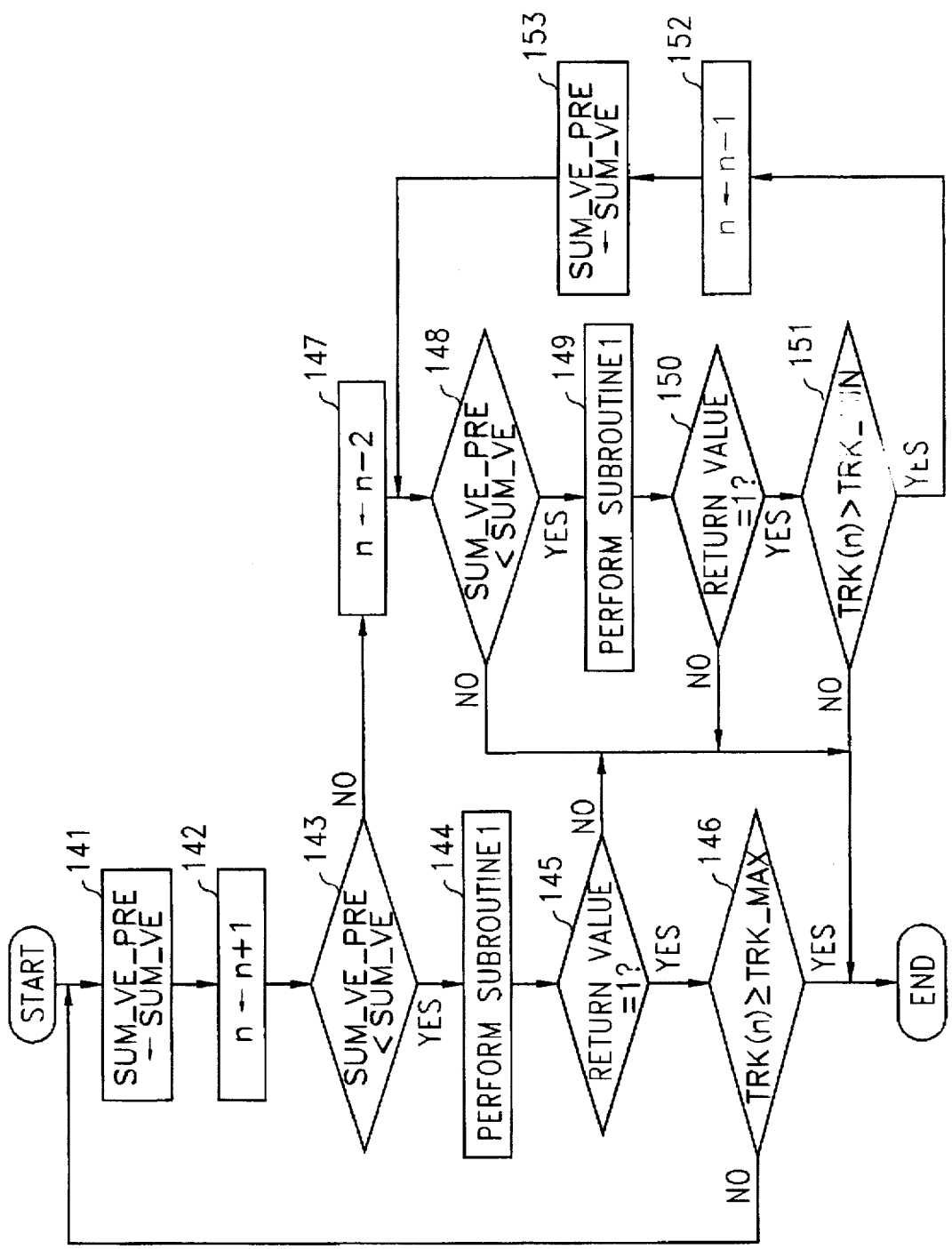
FIG. 6 is a flowchart diagram of a subroutine 3 in the FIG. 3 main flowchart diagram.

Finally, controller 30 performs subroutine 3 of step 140 in FIG. 3. The subroutine 3 calculates the optimum tracking position which maximizes the envelope value of the video signal. FIG. 6 is a flowchart diagram of a subroutine 3 in the FIG. 3 main flowchart diagram. Referring to FIG. 6, the operation of controller 30 for calculating the optimum tracking position will be described below.

Controller 30 samples the DC envelope signal detected for the one head switching pulse generation period by a predetermined number of times and accumulates the sampled DC envelope value, to store the accumulated current value SUM_VE as the previous accumulated value SUM_VE_PRE in step 141. Controller 30 increases current step n by one step, that is, sets that n equals n+1 in step 142. Then, controller 30 compares the current accumulated value corresponding to a new step n+1 with the previous accumulated value corresponding to a new step n in step 143.

If the current accumulated value is larger than the previous accumulated value, that is, if SUM_VE_$_{PRE<SUM}$_VE, controller 30 performs subroutine 1 as shown in FIG. 4 in step 144. After subroutine 1 has been performed in step 144, controller 30 judges again whether the return value is "1" in step 145. If the return value is not "1," controller 30 judges that the current tracking position is located in the range where the noise is regenerated and returns to FIG. 3. If the return value is "1," controller 30 compares the current tracking position value TRK(n) with variable maximum position value TRK_MAX in step 146. If the current tracking position value is not more than the variable maximum position value, that is, if TRK(n)≦TRK_MAX, controller 30 returns to step 141. However, if the current tracking position value is larger than the variable maximum position value, that is, if TRK(n)>TRK_MAX, controller 30 judges that the tracking position is set at a proper position where the maximum envelope can be obtained and stops the operation.

If the current accumulated value is less than the previous accumulated value in step 143, that is, if SUM_VE_PRE>SUM_VE, controller 30 decreases step n by two steps, that is, sets that n equals n−2 in step 147. Then, controller 30 compares the current accumulated value SUM_VE corresponding to a step n−2 with the previous accumulated value. SUM_VE_PRE corresponding to a step n in step 148. If the current accumulated value is less than the previous accumulated value, that is, if SUM_VE_PRE>SUM_VE, controller 30 judges that the current tracking position is a position which can obtain the maximum envelope and stops the operation.

However, if the current accumulated value is larger than or equal to the previous accumulated value, that is, if SUM_VE_PRE≦SUM_VE, controller 30 performs subroutine 1 as shown in FIG. 4 in step 149. After subroutine 1 has been performed in step 159, controller 30 judges again whether the return value is "1" in step 150. If the return value is not "1," controller 30 judges that the tracking position is located in the range where the noise is regenerated and stops the operation. If the return value is "1," controller 30 compares the current tracking position TRK(n) with variable minimum position TRK_MIN in step 151. If the current tracking position is not less than the variable minimum position, that is, if TRK(n)≧TRK_MIN, controller 30 decreases the current step n by one, that is, sets that n equals n−1 in step 152. Then, controller 30 stores the accumulated value in the current tracking step as accumulated value in the previous tracking step in step 153. Then, the operation returns to step 148. However, if the current tracking position reaches the variable minimum position, controller 30 judges that the tracking position is set at a proper position which can obtain the maximum envelope and then returns.

The optimum tracking position can be obtained even in the slow or multiple speed playback by performing subroutines 1 through 3, to which the automatic tracking method can be applied.

As described above, the present invention relates to an automatic tracking method and apparatus during the special playback. In the special playback, the head tracking position moves and is set to a portion where the noise is not regenerated on the screen and the maximum envelope can be obtained. Accordingly, a clear picture without noise can be viewed even in special playback.

While only certain embodiments of the invention have been specifically described herein, it will apparent that numerous modifications may be made thereto without departing from the spirit and scope of the invention.

What is claimed is:

1. An automatic tracking method for a video tape playback device in which heads are tracking-controlled according to a predetermined tracking control value, said automatic tracking method comprising the steps of:

detecting a direct-current (DC) envelope signal of a video signal read from a video tape via video heads;

comparing said detected DC envelope signal with a predetermined threshold value;

detecting a time difference between a point of time when a value of said DC envelope signal becomes below the threshold value and a point of time for switching said video heads; and controlling said predetermined tracking control value so that said detected time difference is within a range where noise is not regenerated on a screen to be displayed.

2. The automatic tracking method according to claim 1, wherein said step of controlling the tracking control value comprises the steps of:

judging whether said detected time difference is within the range where noise is not regenerated on said screen;

if said detected time difference is beyond said range, iteratively varying the tracking control value and comparing an absolute value of the time difference corresponding to a current tracking control value obtained by a respective variation with that of the time difference corresponding to a previous tracking control value prior to respective variation, thereby firstly determining the tracking control value so that said detected time difference is within said range; and if said detected time difference is within said range, iteratively varying the tracking control value and comparing an accumulated value of magnitude of the DC envelope signal corresponding to a current tracking control value obtained by respective variation with that of magnitude of the DC envelope signal corresponding to the previous tracking control value prior to respective variation, thereby secondly determining an optimum tracking control value.

3. The automatic tracking method according to claim 2, wherein said predetermined tracking control value is a value for abnormal speed playback.

4. The automatic tracking method according to claim 2, wherein said first determining step iterates said variation and said comparison of said first determining step, until an absolute value of the time difference corresponding to the current tracking control value obtained by respective variation is larger than or equal to that of the time difference corresponding to the previous tracking control value prior to respective variation.

5. The automatic tracking method according to claim 2, wherein said second determining step iterates said variation and said comprasion of said first determining step, until an accumulated value of magnitude of the DC envelope signal which is included within one period of head switching corresponding to the current tracking control value obtained by respective variation is less than that of of magnitude of the DC envelope signal which is included within one period of head switching corresponding to a previous tracking control value prior to respective variation.

6. A video tape playback device in which heads are tracking-controlled according to a predetermined tracking control value, said video tape playback device comprising:

direct-current (DC) envelope detection means for detecting a direct-current (DC) envelope signal of a video signal read from a video tape via video heads;

comparison means for comparing the detected DC envelope signal with a predetermined threshold value, and outputting a pulse signal representing the comparison result;

servo means for performing a tracking operation according to a tracking control value, and generating a pulse of a head switching signal; and control means for detecting a difference of time between a falling edge in the pulse signal output from said comparison means and a point of level alteration time of said head switching pulse, and controlling said predetermined tracking control value so that said detected time difference is within a range where noise is not regenerated on a screen to be displayed.

7. The video tape playback device according to claim 6, wherein said control means, if said detected time difference is beyond a range where noise is not regenerated on said screen, iteratively varies the tracking control value and compares an absolute value of the time difference corresponding to a current tracking control value obtained by a respective variation with that of the time difference corresponding to a previous tracking control value prior to respective variation, thereby to determine the tracking control value so that said detected time difference is within said range; and if said detected time difference is within said range, iteratively varies the tracking control value and compares an accumulated value of magnitude of the DC envelope signal corresponding to a current tracking control value obtained by respective variation with that of magnitude of the DC envelope signal corresponding to the previous tracking control value prior to respective variation, thereby to determine the optimum tracking control value.

8. The video tape playback device according to claim 7, wherein said predetermined tracking control value is a value for abnormal speed playback.

9. The video tape playback device according to claim 7, wherein said control means iterates said comparison of magnitude between the absolute values of said time differences, until an absolute value of the time difference corresponding to the current tracking control value obtained by variation is larger than or equal to that of the time difference corresponding to a previous tracking control value.

10. The video tape playback device according to claim 7, wherein said control means iterates said comparison of the accumulated value, until an accumulated value of magnitude of the DC envelope signal which is included within one period of head switching corresponding to the current tracking control value obtained by variation is less than that of magnitude of the DC envelope signal which is included within one period of head switching corresponding to a previous tracking control value.

* * * * *